United States Patent [19]

Matuda et al.

[11] Patent Number: 5,603,747
[45] Date of Patent: Feb. 18, 1997

[54] AIR FILTER AND METHOD OF PRODUCING THE SAME

[75] Inventors: Yoshiya Matuda; Masahiro Nawa; Tadayoshi Takiguchi, all of Tokyo, Japan

[73] Assignee: Minnesota Mining and Manufacturing Company, St. Paul, Minn.

[21] Appl. No.: 454,392

[22] PCT Filed: Jan. 31, 1994

[86] PCT No.: PCT/US94/01088

§ 371 Date: Jun. 19, 1995

§ 102(e) Date: Jun. 19, 1995

[87] PCT Pub. No.: WO94/17897

PCT Pub. Date: Aug. 18, 1994

[30] Foreign Application Priority Data

Feb. 2, 1993 [JP] Japan ..................... 5-15296

[51] Int. Cl.⁶ ............... B01D 46/52; B31F 5/00
[52] U.S. Cl. ............... 55/497; 55/511; 55/521; 55/DIG. 5; 156/227; 156/292; 156/308.2; 156/309.6; 264/248; 264/DIG. 48
[58] Field of Search ............... 55/497, 511, 499, 55/502, 521, 527, DIG. 5; 95/273; 264/248, DIG. 48; 156/308.2, 309.6, 227, 292, 470

[56] References Cited

U.S. PATENT DOCUMENTS

| | | | |
|---|---|---|---|
| 2,415,579 | 2/1947 | Dahlman | 55/499 |
| 2,907,408 | 10/1959 | Engle et al. | 55/497 |
| 3,138,443 | 6/1964 | Engle et al. | 55/499 |
| 3,177,637 | 4/1965 | Davis | 55/497 |
| 3,183,286 | 5/1965 | Harms | 55/521 |
| 3,246,457 | 4/1966 | De Baun | 55/DIG. 5 |
| 4,636,231 | 1/1987 | Thorton et al. | 55/497 |
| 4,885,015 | 12/1989 | Goulet et al. | 55/521 |
| 4,976,677 | 12/1990 | Siversson | 55/521 |
| 5,472,537 | 12/1995 | Friel et al. | 156/308.2 |
| 5,501,794 | 3/1996 | Van De Graaf et al. | 55/497 |
| 5,509,950 | 4/1996 | Van De Graaf et al. | 55/497 |

FOREIGN PATENT DOCUMENTS

| | | |
|---|---|---|
| 0450299 | 10/1991 | European Pat. Off. . |
| 2251347 | 6/1975 | France . |
| 1579568 | 11/1980 | United Kingdom . |
| WO90/09837 | 9/1990 | WIPO . |
| WO93/12858 | 7/1993 | WIPO . |

*Primary Examiner*—Jay H. Woo
*Assistant Examiner*—Duane S. Smith
*Attorney, Agent, or Firm*—Gary L. Griswold; Walter N. Kirn; William J. Bond

[57] ABSTRACT

To provide an air filter that does not cause holding members to peel even in a high temperature environment, and which can be produced quickly and easily. An air filter (10) includes a filter member (12), holding members (14) disposed at both longitudinal side edges of the filter member (12), and non-woven fabric members (16) for fixing the filter member (12) and the holding members (14). The filter member (12) includes a non-woven fabric of thermoplastic microfibers. The holding members (14) have a bending resistance sufficient to maintain its shape and hold the filter member (12) in its pleated state. The non-woven fabric members (16) have a heat resistance with a melting point not lower than 90° C. and a temporary fixing ability capable of being disposed at the edge portions of the filter member (12) without using a jig.

9 Claims, 2 Drawing Sheets

AIR FILTER AND METHOD OF PRODUCING THE SAME

BACKGROUND OF THE INVENTION

1. Field of Utilization in Industry

This invention relates to an air filter having a pleated filter member for filtering contaminated air and to a method of producing such an air filter.

2. Prior Art

Conventionally, an air filter having a filter member made of a sheet-like porous material, such as a paper or a non-woven fabric, has been used as means for filtering contaminated air, which is provided in an air cleaner for home use or for an automobile, a vacuum cleaner, and so forth. Generally, an air filter of this kind is equipped with a filter member obtained by folding the sheet-like porous material into a pleat form in order to improve filtering efficiency and service life of the filter member. The pleated filter member is held in a predetermined folded form by independent holding members that are fixed to the edge portions of the filter member generally throughout the full length thereof to realize desired filter effects and to facilitate mounting at a given position or exchanging thereof. The holding members are made of a sheet-like material having a rigidity sufficient to maintain at least its own shape. Commercially available adhesives, doublecoated adhesive tapes, heat-fusible films, etc., have been used as a bonding material for mutually fixing the holding members and the filter member.

When the air filter described above is used in an apparatus that is expected to be used in a high temperature environment, such as an air cleaner for an automobile, the bonding material must have a desired heat resistance. In the case of an air cleaner for an automobile, for example, the bonding material of the air filter must have a heat resistance of not lower than 90° C. If the bonding material is not heat resistant, the bonding material melts under high temperature conditions, so that the filter member and the holding members peel off from one another, consequently the filter member cannot hold a pleat form, losing a desired filtering effect. Commercially available double-coated adhesive tapes, for example, do not have high heat resistance.

On the other hand, in production when the holding members are fixed to the edge portions of the filter member, which are folded into pleat form and cut into a predetermined dimension, through the bonding material, it is generally necessary to support the filter member and the holding members at predetermined positions by jigs. For example, when the bonding material is made of a heat resistant adhesive (such as an epoxy adhesive), jigs have been used for, respectively, supporting the filter member and the holding members. The jigs prevent relative movement between the filter member and the holding members until the adhesive cures.

When a heat-fusible film, generally made of vinyl acetate, polyamide, an ethylene-vinyl acetate copolymer, etc., is used as the bonding material, the holding members are first positioned at the edge portions of the filter member with the heat-fusible film. The holding members and heat-fusible film are then heated under pressure by, e.g., a high temperature metal block from the outer face of the holding members, thereby heating and melting the heat-fusible film fixing the filter member edge portions and the holding members. A heat-fusible film having the desired heat resistance, that is, a melting point not lower than 90° C., is not generally tacky.

Therefore it is necessary to position and fixedly support the flexible heat-fusible film by jigs at predetermined positions along the edge portions of the filter member, which is also maintained in the pleated form by a jig unless it can maintain its own shape under deformation. The film is then clamped between the holding members, which are supported by another jig, and the filter member, followed by heating under pressure. When the heat-fusible film is heated, the temperature and the heating time must be accurately controlled so that the melted film does not flow out.

As described above, problems arise when an air filter is produced using a heat resistant bonding material. Workability deteriorates significantly due to the use of jigs for supporting the holding members and the heat-fusible film. The working time is also increased.

The object of the present invention is to provide an air filter which can obtain a desired filtering effect, due to the filter member being maintained in a pleated form by holding members which do not peel apart even under a high temperature environment, not lower than 90° C., which air filter can be produced quickly and easily without using jigs for fixing and supporting the holding members during the production process.

It is another object of the present invention to provide a method of producing such an air filter.

SUMMARY OF THE INVENTION

The present invention employs a construction wherein non-woven fabric members, made of polymeric fiber material having a melting point not lower than 90° C., are used as bonding material for mutually fixing a filter member and holding members of an air filter. Accordingly, even when the air filter is used where the filters are expected to be exposed to a high temperature environment such as an air cleaner of an automobile, the holding members do not peel, and the desired filtering effect can be maintained while retaining the pleated structure of the filter member. Moreover, the non-woven fabric member has a temporary fixing ability whereby it can be disposed on the edge portions of the filter member without using a jig due to the non-woven fabric members bulkiness and fibrous surface. The invention air filter can be easily produced within a short period of time.

DETAILED DESCRIPTION OF THE PREFERRED EMBODIMENTS

Figure 1:
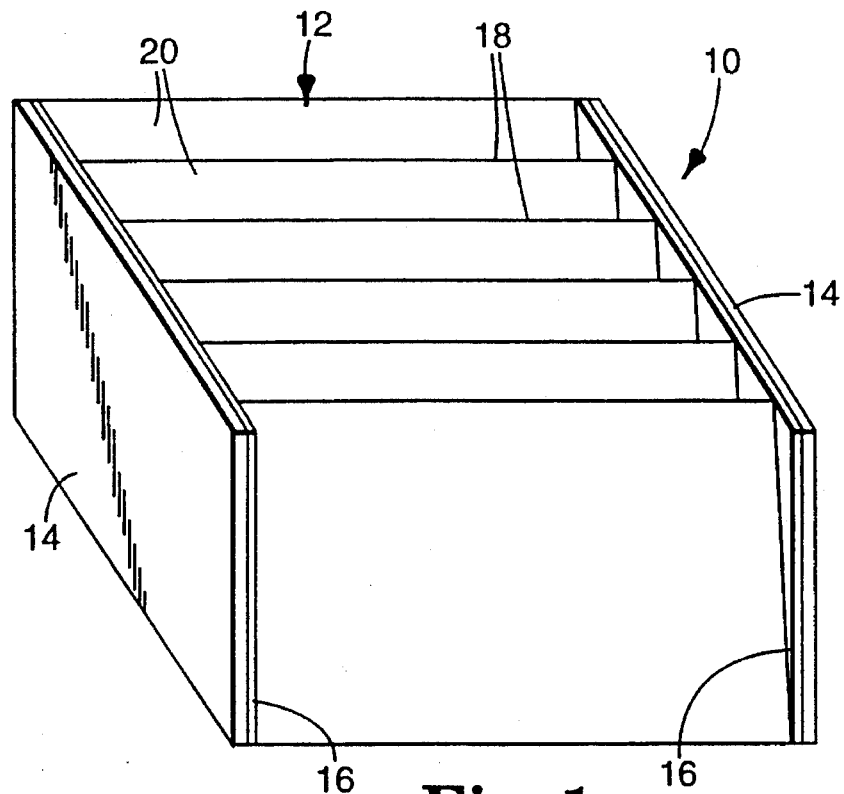
FIG. 1 A perspective view of an air filter according to an embodiment of the present invention.

To accomplish the above objects, the present invention aims at using a heat-fusing non-woven fabric made of a polymeric fiber material that has both heat resistance, assuming a melting point not lower than 90° C., and a temporary fixing ability that ensures engagement with the edge of the filter member without the use of jigs.

Therefore, an air filter according to the present invention comprises a filter member, a holding member and non-woven fabric member. The filter member is formed by folding a sheet-like porous material into pleat form, the material being capable of filtering contaminated air, and having a plurality of filter portions connected through bent portions. The holding members, resistant to stretching forces, are fixed to edge portions of the filter member, generally throughout the full length of the edge portions, and hold the filter member in a pleated form wherein the filter portions are arranged with a predetermined gap therebetween. The holding members can maintain length and width dimensions under tension. The non-woven fabric members are made of a thermoplastic polymeric fiber material, and arranged between the edge portions of the filter member and the holding members. The non-woven fabric is at least partially melted by being heated to a predetermined temperature so as to mutually fix the filter member and the holding members.

According to a preferred embodiment of the present invention, the non-woven fabric members comprise melt-blown type non-woven fabrics formed by randomly mixing melt-blown microfibers and crimped staple fibers, both made of thermoplastic polymeric materials, at a predetermined weight ratio. In this case, the melting point of the crimped staple fibers is preferably higher than that of the microfibers. Further, the filter member may comprise a non-woven fabric having the same microfibers as those of the non-woven fabric members, and the holding members may comprise a sheet-like fibrous material having a bending resistance enabling it to at least maintain its own shape. Furthermore, in view of facilitating the handling thereof, the basis weight of the non-woven fabric members, before heating and melting, is preferably in a range from 40 to 100 g/m².

Furthermore, the present invention provides a method of producing an air filter equipped with a filter member made of a sheet-like porous material capable of filtering contaminated air. The method comprises the steps of folding a sheet-like porous material into a pleated form and then cutting it to predetermined dimensions so as to form a filter member; arranging the sheet-like holding members on the edge portions of the filter member, while interposing the non-woven fabric members; and applying a predetermined heat and pressure to the sheet-like holding members from the face opposite the face in contact with the non-woven fabric members so as to melt at least portions of the non-woven fabric members coming into contact with the filter member, and mutually fixing the filter member and the sheet-like holding members.

According to a preferred embodiment, the method may further comprise the step of mutually fixing the non-woven fabric members and the sheet-like holding members before arranging them at the edge portions of the filter member.

Further, the non-woven fabric members may be formed by randomly mixing melt-blown microfibers and crimped staple fibers, both made of a thermoplastic polymeric material, at a predetermined weight ratio. In order to obtain an easy manufacturing process, the microfibers and the staple fibers may be mixed in a weight ratio ranging from 90:10 to 10:90.

The non-woven fabric members may be heated for a period of 60 seconds or less at 200° C.±50° C. in the heating and melting step. When the heating temperature is less than 150° C., the adhesion between the filter member and the non-woven fabric members can be insufficient, and when the heating temperature is more than 250° C., the filter member can be injured. The heating period may be determined by the adhesion between the filter member and the non-woven fabric members, and how the heat influences the filter member. The heating period is preferably 60 seconds or less, and more preferably 30 seconds or less, in the above-mentioned temperature range.

The non-woven fabric members have a bulky and porous structure, as their general properties, in which a large number of fibrous materials are entangled at random with one another. When the non-woven fabric members are interposed between the edge portions of the filter member and the holding members, the fibrous materials of the non-woven fabric members become entangled with the edge portions of the filter member, temporarily fixing the non-woven fabric members to the edge portions of the filter member. The non-woven fabric members can be easily positioned, fixed and supported without using a jig necessary for conventional heat resistant fusible films. To heat and melt the non-woven fabric members, it is necessary only to heat portions of the bulky non-woven fabric members that come into contact with the filter member. Control of the heating temperature and the heating time is relatively easy. The thermoplastic polymeric fiber material constituting the bonding fibers of the non-woven fabric members generally have a softening point higher than 90° C. Therefore, an air filter using such non-woven fabric members as bonding materials can be suitably used in devices expected to be installed in high temperature environments such as automobile air cleaners, and the like.

By mixing crimped staple fibers with melt-blown microfiber non-woven fabric members, the bulkiness of the non-woven fabric members increases, and the temporary fixing effect can be improved. When this crimped staple fiber has a higher melting point than that of the microfibers, the microfibers act as bonding fibers. Therefore, the outflow of the melted thermoplastic material can be reliably prevented by controlling the heating temperature and the heating time in such a manner as to melt only the microfibers during the heating and melting process. Where the holding members are dimensionally stable non-wovens and the filter member comprises a non-woven fabric formed of the same microfibers as those of the non-woven fabric members the edge portions of the filter member are also partially melted during the heating and melting process. The melted non-woven fabric members can also easily permeate the holding members, thereby further increasing the fixing ability of the non-woven fabric members. In this case, the non-woven fabric members are also temporarily fixed to the holding members, due to the mutual entanglement of the fibrous materials thereof, further improving the workability of the heating and melting processes.

The present invention will be explained in more detail with reference to preferred embodiments thereof shown in the accompanying drawings.

Figure 2:
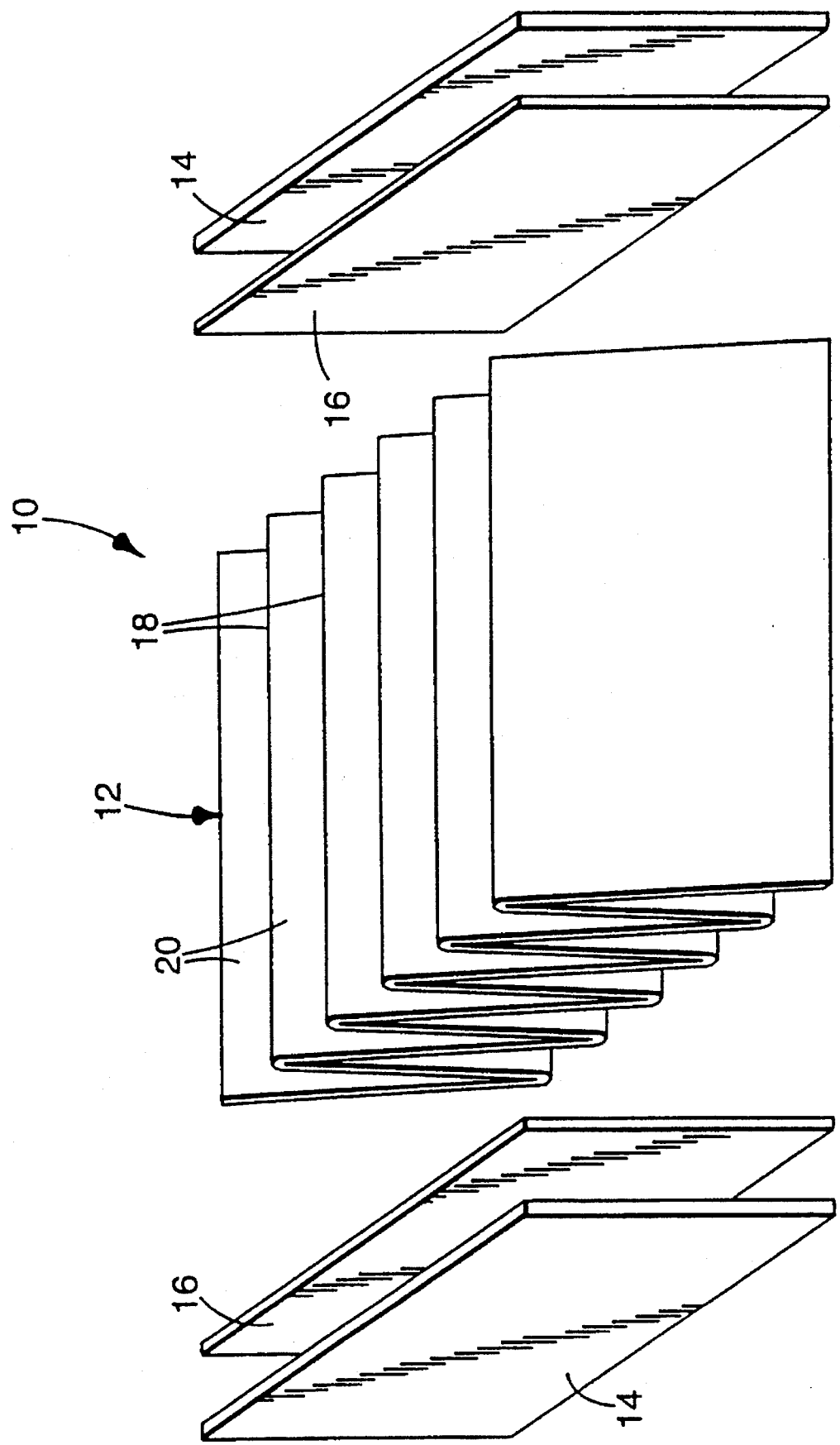
FIG. 2 An exploded perspective view of the air filter shown in FIG. 1.

Referring to FIG. 1, an air filter 10 according to an embodiment of the present invention comprises a filter member 12 folded in a pleated form, a pair of holding members 14 disposed at both longitudinal side edges of the filter member 12, and non-woven fabric members 16 disposed between the filter member 12 edge portions and the holding members 14. The filter member 12 is preferably formed from a non-woven fabric of fibers made of a thermoplastic polymeric material, and produced by folding a large sheet-like non-woven fabric into a pleat form, as shown in FIG. 2, and then cutting it into a desired dimension. Folding the filter media 12 into pleat form provides a plurality of filter portions 20 connected through bent portions 18. A preferred polymeric fiber material for the filter member 12 is polypropylene, e.g., electrostatically charged polypropylene. Preferred fibers are melt-blown microfibers and split film electrostatically charged fibers. Alternatively, the filter member 12 can be formed from other known filter materials such as paper.

The holding members 14 are sheet-like members, each having substantially rectangular surfaces, with one of these surfaces fixed to the longitudinal side edge portion of the filter member 12 over the full length thereof through the non-woven fabric member 16. Accordingly, the holding members 14 hold the filter member 12 in the pleat form, as shown in FIG. 2, where the filter portions 20 are arranged with predetermined gaps therebetween. The holding member 14 is made of a sheet-like fibrous material resistant to stretching and preferably having a bending resistance enabling it to maintain at least its own shape. A preferred material is a commercially available carded non-woven fabric made of acrylic fibers. However, all other materials can be employed so long as they can fuse with the bonding polymer material of the non-woven fabric member 16 and can transmit heat for melting fibers of the non-woven fabric member 16 without melting themselves.

A flexible material can also be used for the holding member 14. In this case, the holding member 14 is held in an extended state by a tensioning means, while the filter member 12 is fixed to the holding member 14. This is advantageous where it is desirable to fold the filter member 12, prior to using the air filter by bringing the filter portions 20 into contact with each other. When being used, the filter member 12 is stretched to the shape it had in the fixing step, with the proper predetermined gap between the filter portions 20.

The non-woven fabric members 16 are melt-blown non-woven fabrics formed by randomly mixing melt-blown microfibers and crimped staple fibers both made of thermoplastic polymeric materials at a predetermined weight ratio. A preferred melt-blown non-woven fabric is described in, e.g., Japanese Unexamined Patent Publication (Kokai) No. 53-41577. The microfiber material forming the non-woven fabric member 16 is preferably polypropylene, and the crimped staple fiber material is preferably a polyester. The polyester crimped staple fibers further enhance the bulkiness of the non-woven fabric member 16 and improves the temporary fixing effect. Further, the polyester crimped staple fibers have a higher melting point than that of polypropylene, therefore, when the non-woven fabric member 16 is heated and melts, the polyester crimped staple fibers can retain the melted polypropylene inside the fibrous structure preventing an outflow of the melted polypropylene. Alternatively, the non-woven fabric members can be formed of non-consolidated or partially consolidated webs of staple fibers and staple fiber blends by use of a carding machine or Rando™ web machine or the like.

EXAMPLE

An example of the production process of the air filter 10 will be explained on the basis of a sample construction, the heat resistance of which was tested by the inventors of the present invention. First, a non-woven fabric made of 100% polypropylene microfibers is folded into a folding height of 30 mm and a folding pitch of 6 mm, and cut into a length of 300 mm and a width of 100 mm, into a pleated state, forming the filter member 12. Also, a melt-blown type non-woven fabric (the non-woven fabric member 16) with a basis weight of 100 g/m², made of 65 wt % of polypropylene melt-blown microfibers and 35 wt % of polyester staple fibers, is laminated to a commercially available carded non-woven fabric (the holding member 14) with a desired thickness, made of acrylic fibers. The carded non-woven acrylic fiber fabric 14 and the melt-blown type non-woven fabric 16 are temporarily fixed to each other by the mutual entanglement of the fibers thereof. Next, this laminate is cut to a length of 100 mm and a width of 30 mm forming a temporarily fixed laminate of holding member piece 14 and non-woven fabric member 16. After two laminated pieces are formed, the two pieces are disposed at the two longitudinal side edge of the filter member 12 so that the non-woven fabric 16 comes into gentle contact with the side edges. At this time, the fibers of the non-woven fabric members 16 become entangled with the side edges of the filter member 12 and the fibrous surfaces of the filter portions 20, so that the laminate pieces are temporarily fixed to the side edges of the filter member 12. In this state, a metal block heated to 200° C. is placed on the outside surface of the holding members 14. The heated surface is not in contact with the non-woven fabric member 16. The non-woven fabric member 16 is indirectly heated for 20 seconds. Consequently, at least portions of the polypropylene microfibers of the non-woven fabric member 16 are melted and the filter member 12 and the holding member 14 are fixed to one another. When the non-woven fabric members 16 are heated and melted, the edge portions of the filter member 12 are also partially melted, and the melted non-woven fabric members 16 permeate the holding members 14 and reliably fix the holding members 14 to the filter member 12.

Figure 3:
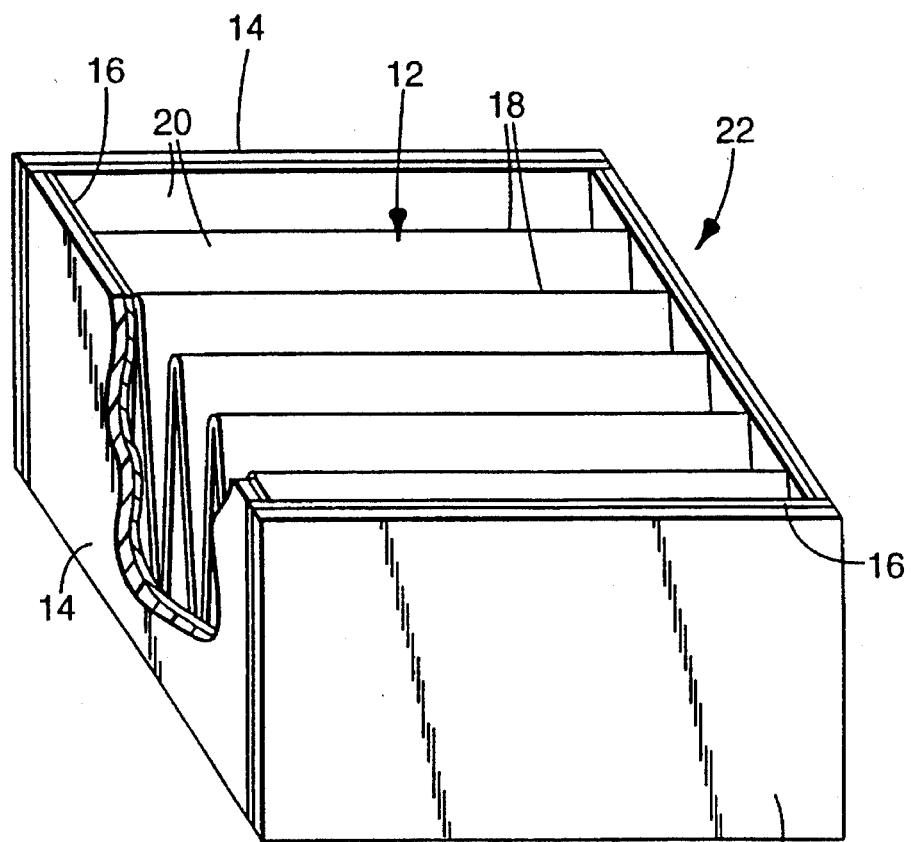
FIG. 3 A partially cut-away perspective view of an air filter according to another embodiment of the present invention.

In the production process of the air filter as shown in FIG. 3 an air filter 22 having four holding members 14 fixed to the four surrounding surfaces is formed by forming four laminate pieces, as described above, disposed on the longitudinal and transverse side edges of the filter member 12. When the air filter 22 was left standing at 90° C. for 3 days, and its heat resistance was tested, peel between the filter member 12 and the holding members 14, due to softening or melting of the non-woven fabric members 16, did not occur at all.

In the production process described above, it is possible to temporarily fix the non-woven fabric members 16 to the side edge portions of the filter member 12 and then to temporarily fix the holding members 14 to the outer surface of the non-woven fabric members 16, instead of using the laminated pieces of the holding members 14 and the non-woven fabric members 16, temporarily fixed in advance.

We claim:

1. An air filter comprising:

a filter member formed by folding a sheet of porous material into a pleated form, the material being capable of filtering contaminated air, and having a plurality of filter portions connected through bent portions;

holding members resistant to stretching forces fixed to edge portions of said filter member for holding said filter member in said pleated form wherein adjacent filter portions are spaced with a predetermined gap forming the pleated form of the filter member, and non-woven fabric members made of a thermoplastic polymeric fiber material said non-woven fabric members arranged between the edge portions of said filter member and said holding members, which non-woven fabric members are at least partially melted by being heated to a predetermined temperature said non-woven fabric members mutually fixing said filter member edge portions to said holding members.

2. An air filter according to claim 1, wherein said non-woven fabric members comprise melt-blown non-woven fabrics formed by randomly mixing melt-blown microfibers and crimped staple fibers, both made of a thermoplastic polymeric material, at a predetermined weight ratio.

3. An air filter according to claim 2, wherein the melting point of at least a portion of said crimped staple fibers is higher than that of at least a portion of said melt-blown microfibers.

4. An air filter according to claim 1, wherein said filter member comprises a non-woven fabric formed of the same melt-blown microfibers as those of said non-woven fabric members, and said holding members comprise a sheet of fibrous material having a bending resistance enabling it to maintain its shape.

5. An air filter according to claim 1, wherein the basis weight of said non-woven fabric members before heating and melting is in a range of from 40 to 100 g/m$^2$.

6. A method of producing an air filter equipped with a filter member made of a sheet of porous material capable of filtering contaminated air, comprising the steps of:

folding a sheet of porous filter material into a pleated form and cutting it into predetermined dimensions so as to form a filter member;

arranging holding members, that are resistant to stretching forces, on edge portions of said filter member, while interposing non-woven fabric members made of a thermoplastic polymeric fiber material between the molding members and the edge portions of the filter member; and applying a predetermined heat and pressure to said holding members from a side opposite to the side in contact with said non-woven fabric members so as to melt at least portions of said non-woven fabric members coming in contact with said filter member, thereby mutually fixing said filter member and said holding members.

7. A method according to claim 6, comprising the step of mutually fixing by fiber entanglement said non-woven fabric members and said holding members before arranging them at the edge portions of said filter member.

8. A method according to claim 6 or 7, wherein said non-woven fabric members are formed by randomly mixing melt-blown microfibers and crimped staple fibers, both made of a thermoplastic polymeric material, at a predetermined weight ratio.

9. A method according to any one of claims 6 to 2, wherein said non-woven fabric members are heated for a period of 60 seconds and less at 200° C.±50° C. in said heating and melting step.

* * * * *